United States Patent
Chang et al.

(10) Patent No.: US 7,263,186 B2
(45) Date of Patent: Aug. 28, 2007

(54) SPEED-UP HARDWARE ARCHITECTURE FOR CCMP ENCRYPTION PROTOCOL

(75) Inventors: Chih-Pen Chang, Taipei (TW); Ming-Shiang Lai, Taipei (TW)

(73) Assignee: Ali Corporation, Taipei (TW)

( * ) Notice: Subject to any disclaimer, the term of this patent is extended or adjusted under 35 U.S.C. 154(b) by 701 days.

(21) Appl. No.: 10/721,289

(22) Filed: Nov. 26, 2003

(65) Prior Publication Data
US 2005/0010802 A1 Jan. 13, 2005

(30) Foreign Application Priority Data
Jun. 10, 2003 (TW) ................................ 92115621 A

(51) Int. Cl.
*H04K 1/04* (2006.01)
(52) U.S. Cl. ............................ 380/37; 380/30; 380/29; 726/3
(58) Field of Classification Search .................... 726/3; 380/37, 30, 29, 264
See application file for complete search history.

(56) References Cited
U.S. PATENT DOCUMENTS 5,121,429 A * 6/1992 Guppy et al. ................. 380/30
5,802,389 A * 9/1998 McNutt .......................... 710/1
7,106,860 B1 * 9/2006 Yu et al. ....................... 380/37
2002/0061003 A1 * 5/2002 Sumner et al. ............. 370/338

* cited by examiner

*Primary Examiner*—Thanhnga B. Truong
(74) *Attorney, Agent, or Firm*—Troxell Law Office, PLLC

(57) ABSTRACT

A speed-up hardware architecture used in wireless encryption/decryption operation comprises: a plurality of operation units, that each operation unit is capable of accomplishing a designated operation independently, further comprising: a data receiving device having two inputs that a first input is used for receiving an external data signal and a second input is used for receiving a supporting signal coming from the other operation unit, wherein when an operating mode of the data receiving device is "normal", the data receiving device will output the first input, and when an operating mode of the data receiving device is "speed-up", the data receiving device will output the second input; and an operating device coupling to the data receiving device for processing the data from the data receiving device and outputting the processed data thereafter; and a control unit coupling to every operation unit in the architecture for enabling the operation units which are idle to assist the working operation units for data processing, further comprising: a controlling device coupling to the data receiving device of every operation unit in the architecture for issuing a control signal and changing operating mode; and an integrating device coupling to the operating device of every operation unit in the architecture for integrating outputs coming from the operating devices of operation units which are in "speed-up mode".

7 Claims, 4 Drawing Sheets

SPEED-UP HARDWARE ARCHITECTURE FOR CCMP ENCRYPTION PROTOCOL

BACKGROUND OF THE INVENTION (a). Field of the Invention

The present invention relates to a speed-up hardware architecture used in wireless encryption/decryption operation, more particularly, to a speed-up hardware architecture that is able to reduce the happening of idle condition.

(b). Description of the Prior Arts

Nowadays, along with the progress of wireless telecommunication technology, all kinds of products, such as cellular phone, notebook computer, personal digital assistant (PDA), etc., have fulfilled humans' desire for wireless communication that not only enables users to be able to free from the constraint of corded phone, but also gives users more freedom and, the same time, shortens the distance between people.

Ever since the Institute of Electrical and Electronic Engineers (IEEE) launched the wireless standard, there have been fears about its security. Broadcasting data packets over a 1,500 m radius is different from sending them over cables. The problem with broadcasting data over a relatively wide area is that smart people with the right equipment can intercept the signal and further uses the intercepted signal to hack the network, such as forging, tampering, etc. Security experts are concerned at the disparity between the amount of wireless network activity in the corporate community and the low level of awareness of the vulnerability of radio local area networks (LANs). In order to enhance the security features provided in a wireless LAN (WLAN) system, the IEEE has established an encryption standard protocol adopting advance encryption standard (AES), that is, the IEEE 802.11i counter mode with CBC-MAC protocol (CCMP), wherein the 802.11i specification defines a new encryption method based on the advanced encryption standard (AES). AES based encryption can be used in a number of different modes or algorithms. The mode that has been chosen for 802.11i is the counter mode with CBC-MAC (CCM). The counter mode delivers data privacy while the CBC-MAC delivers data integrity and authentication, moreover, AES is a symmetric iterated block cipher meaning that the same key is used for both encryption and decryption, multiple passes are made over the data for encryption, and the clear text is encrypted in discrete fixed length blocks. The AES standard uses 128-bit blocks for encryption, and for 802.11i the encryption key length is also fixed at 128 bits.

As seen in FIG. 1, which is a diagram showing a CCMP apparatus, wherein a signal is received by a CCM control logic according to a standard encryption steps to accomplish a message integrity check (MIC) and an encryption/decryption operation using AES encryptor. In order to increase the speed of the foregoing operations, traditional hardware design use two AES encryptors respectively for processing the MIC calculation and the encryption/decryption operation. Now please refer to FIG. 2, which is a subdivision diagram depicting the MIC calculation and the encryption/decryption operation of a packet. In wireless transmission, packet is employed as a transmission unit and can be divided into two portions, wherein the first portion comprises an initial zone and a zone of headers, and the second portion is a zone of payloads. In the first portion, the initial zone occupying 16 bytes is used for notification and initialization, and the zone of headers occupying 32 bytes is used for storing the data necessitated for transmission and the control code. Moreover, the payload zone is the actual portion used for data transmission in that the amount of payloads, which is referred as N, normally will not be too large for reducing error rate during wireless transmission. For the sake of message integrity, since the purpose of message integrity check is to avoid the message to be tampered or partially deleted, therefore, an integrity input signal 70 should comprise the two aforementioned portions including the initial zone, the headers and the payloads to ensure the message integrity. On the other hand, for the sake of preventing the transmitted data from spying by an unauthorized person, since the headers do not contain any transmitted data, therefore, the encryption/decryption input signal 72 will only need to comprise the payloads and the MIC calculation result.

To sum up, a conventional apparatus feeds the integrity input signal 70 into a first AES encryptor 1a for calculating and acquiring a MIC value thereafter, and subsequently the encryption/decryption input signal 72 comprising the acquired MIC value and the payloads are then fed into a second AES encryptor 1b to finish the encryption process. The process usually uses a 16 bytes block (i.e. 128 bits) as a unit which is fed into the AES encryptor successively and orderly. However, the two AES encryptors are not always operating, An idle AES encryptor is sometimes happened and will cause the waste of resource. During an encryption/decryption process, since the relating calculations are very complex that the bottleneck of the process is usually happened in the encryption/decryption operation. Hence, in order to accelerate the process speed, the idling of AES encryptor must be avoided.

SUMMARY OF THE INVENTION

The primary object of the present invention is to provide a speed-up hardware architecture for reducing the happening of idle conditions so as to enhance operation efficiency.

In order to achieve the foregoing object, the speed-up hardware architecture used in wireless encryption/decryption operation of the present invention comprises:

a plurality of operation units, that each operation unit is capable of accomplishing a designated operation independently, further comprising:
- a data receiving device having two inputs that a first input is used for receiving an external data signal and a second input is used for receiving a supporting signal coming from the other operation unit, wherein, when the operating mode of the data receiving device is "normal", the data receiving device will output the first input, and when the operating mode of the data receiving device is "speed-up", the data receiving device will output the second input; and
- an operating device coupling to the data receiving device for processing data from the data receiving device and outputting the processed data thereafter;

and a control unit coupling to every operation unit in the architecture for enabling operation units which are idle to assist working operation units for data processing, further comprising:
- a controlling device coupling to the data receiving device of every operation unit in the architecture for issuing a control signal and changing the operating mode; and
- an integrating device coupling to the operating device of every operation unit in the architecture for integrating outputs coming from the operating devices of operation units which are in "speed-up mode".

Other and further features, advantages and benefits of the invention will become apparent in the following description taken in conjunction with the following drawings. It is to be understood that the foregoing general description and following detailed description are exemplary and explanatory but are not to be restrictive of the invention. The accompanying drawings are incorporated in and constitute a part of this application and, together with the description, serve to explain the principles of the invention in general terms. Like numerals refer to like parts throughout the disclosure.

BRIEF DESCRIPTION OF THE DRAWINGS

The objects, spirits and advantages of the preferred embodiments of the present invention will be readily understood by the accompanying drawings and detailed descriptions, wherein.

DETAILED DESCRIPTION OF THE PRESENT INVENTION

The following embodiments will illustrate the device and the method for processing the digital image of the present invention in detail.

Figure 1:
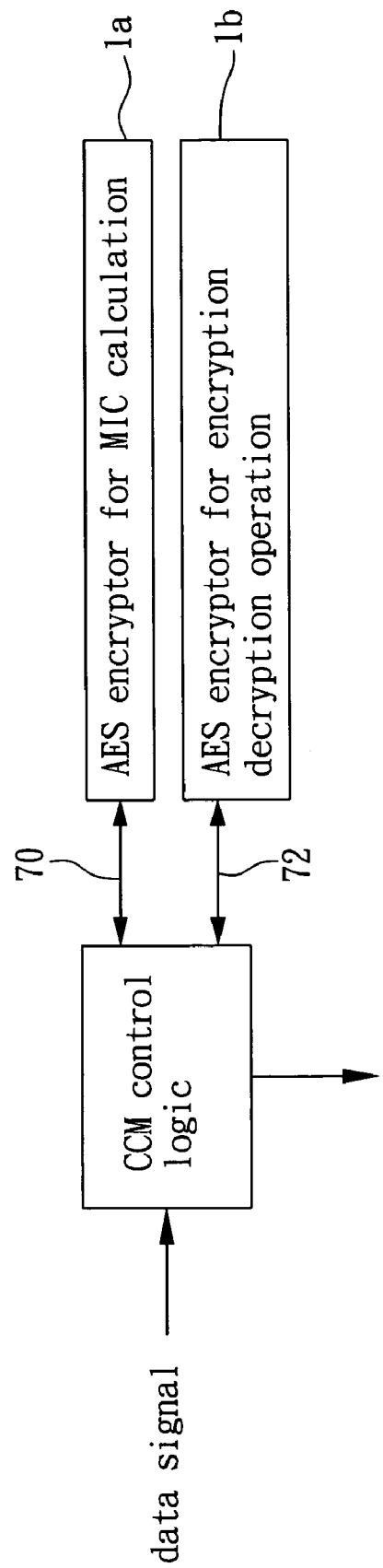
FIG. 1 is a diagram showing a CCMP apparatus.
Figure 2:
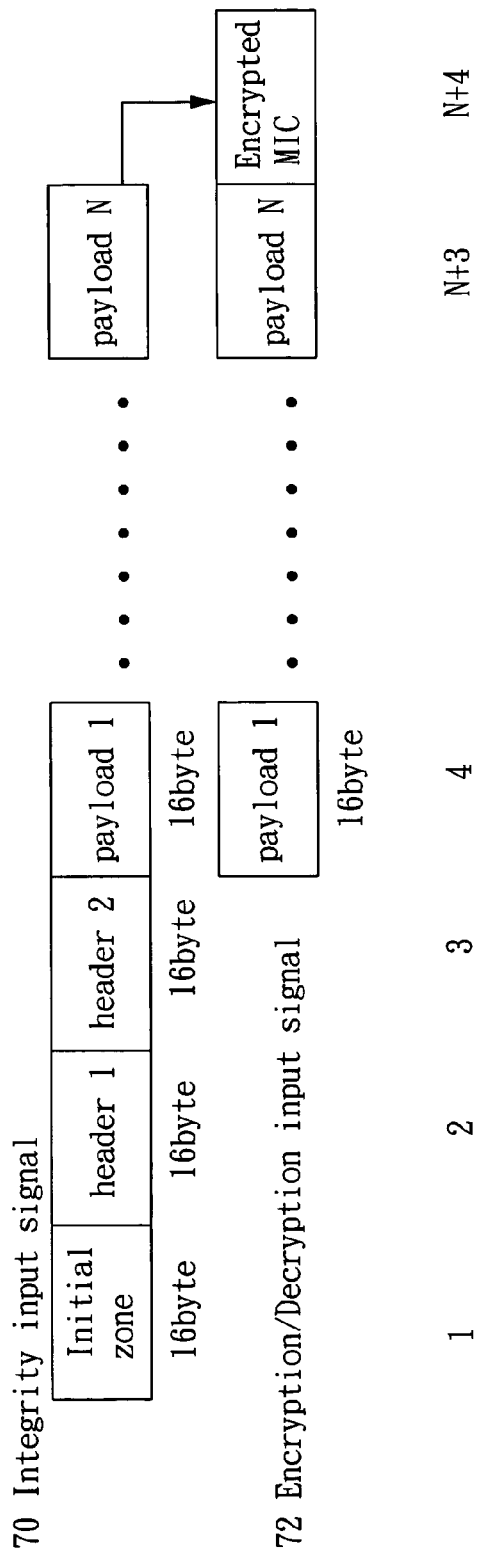
FIG. 2 is a subdivision diagram depicting a packet for the MIC calculation and the encryption/decryption operation.
Figure 3:
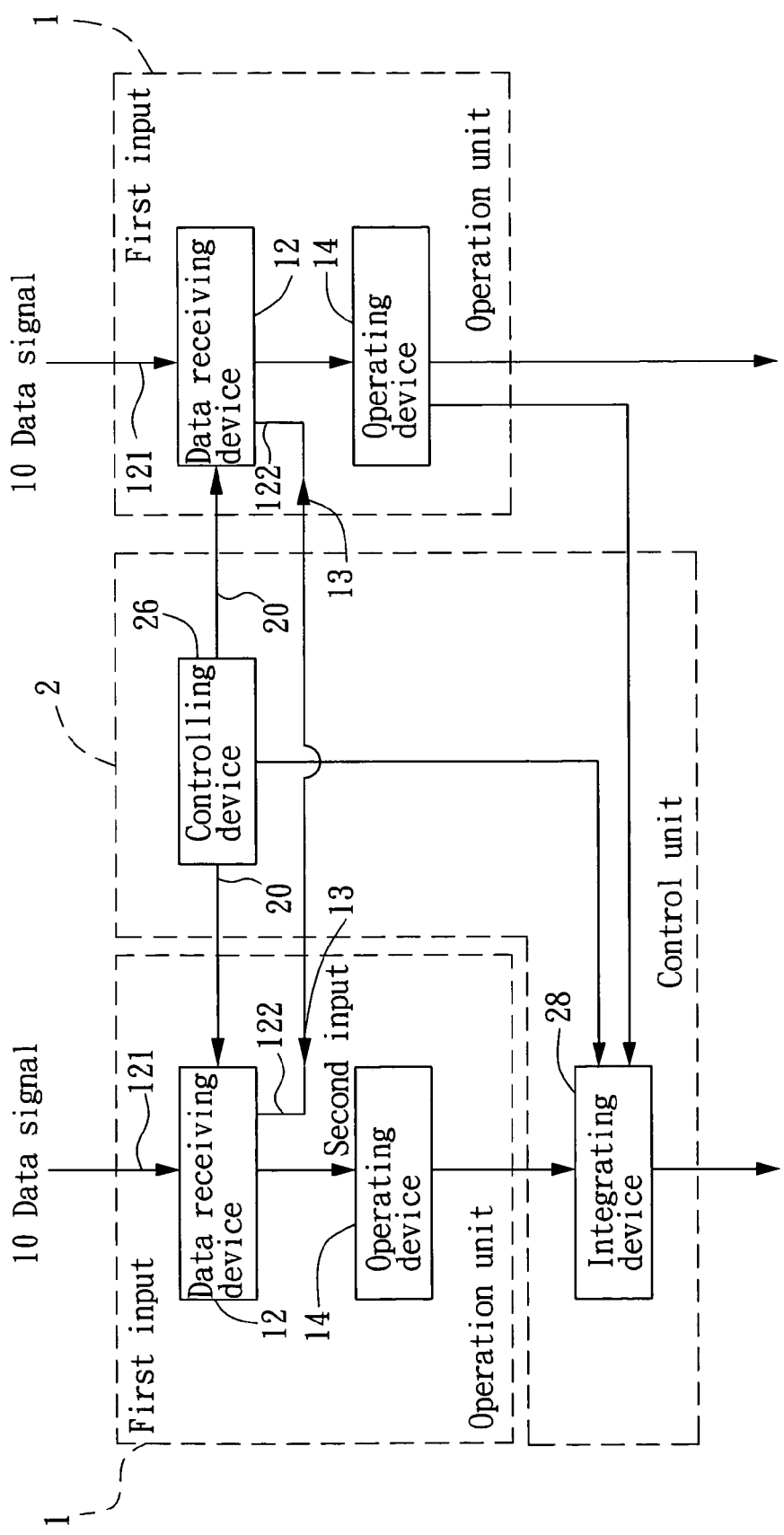
FIG. 3 is a diagram depicting an architecture of the present invention.

Please refer to FIG. 3, which is a diagram depicting an architecture of the present invention. The spirit of the present invention is to use those idle operation units for assisting those working operation units. In this ragard, the present invention comprises:

a plurality of operation units 1, that each operation unit 1 in the architecture is capable of accomplishing a designated operation independently, such as encryption, authentication or other arithmetic logic operations, moreover each operation unit 1 further comprising:
  a data receiving device 12 having two inputs that a first input 121 is used for receiving an external data signal 10 and a second input 122 is used for receiving a supporting signal 13 coming from the other operation unit, moreover, when an operating mode of the data receiving device 12 is in "normal", the data receiving device 12 will output the first input 121, and when an operating mode of the data receiving device 12 is "speed-up", the data receiving device 12 will output the second input 122; furthermore, the data receiving device 12 can be a multiplexer, in addition, every data receiving device is able to be inter-connected for communicating the supporting signal between the operation units; and
  an operating device 14 coupling to the data receiving device 12 for processing data from the data receiving device 12, such as arithmetic logic operations, and outputting the processed data thereafter;
and
a control unit 2 coupling to every operation unit 1 in the architecture for enabling the operation units 1 which are idle to assist the working operation units 1 for data processing, further comprising:
  a controlling device 26 coupling to the data receiving device 12 of every operation unit 1 in the architecture for issuing a control signal 20 and changing operating mode; and
  an integrating device 28 coupling to the operating device 14 of every operation unit 1 in the architecture and also the controlling device 26 for integrating outputs coming from the operation units 1 which are in "speed-up mode", i.e. integrating the operation result of the working operation unit 1 with the operation results coming from the other operation units.

Figure 4:
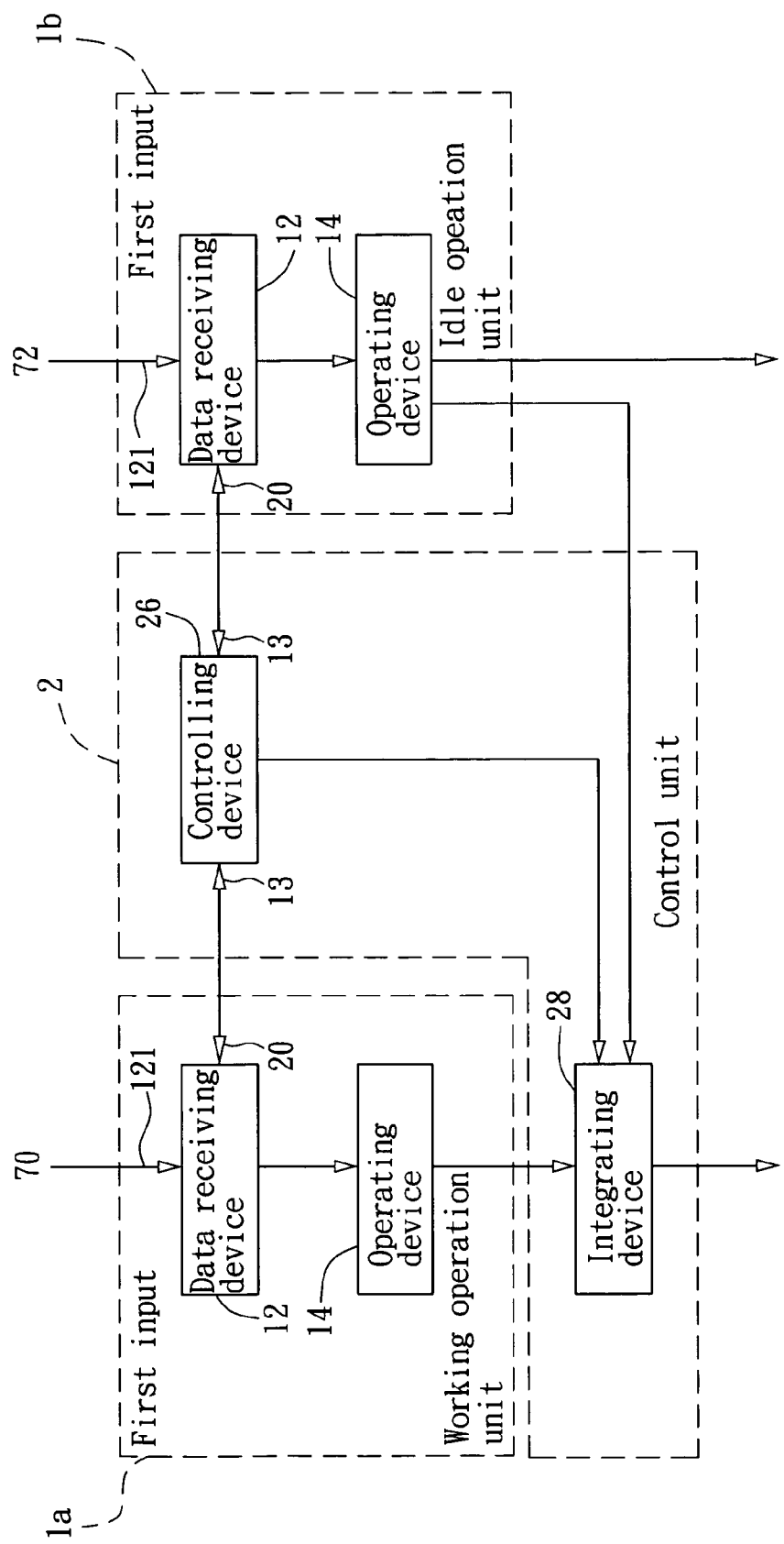
FIG. 4 is an embodiment of the present invention.

Please refer to FIG. 4, which is an embodiment of CCMP encryption protocol according to the present invention. The present embodiment comprises two AES encryptors 1a, 1b. Each input of the AES encryptor is 128-bit blocks. Nevertheless, each AES encryptor can only processes 32 bits of data in one unit time. Thus, a double word selection logic is needed for dividing the input of 128 bits into four 32 bits inputs that are processed successively. Therefore, The present embodiment employs the double word selection logic as the data receiving device 12. Furthermore, the operation conditions of the two operation units 1a, 1b are monitored by the control unit 2. When the control unit 2 detects the condition of the second AES encryptor 1b is idle, the controlling device 26 of the control unit 2 will send a control signal 20 into the second AES encryptor 1b to change the operating mode thereof from "normal mode" to "speed-up mode" so that the second AES encryptor 1b can assist the working first AES encryptor 1a for accelerating the operation. The same time, the first AES encryptor 1a sends the supporting signal 13 from the double word selection logic to the second AES encryptor 1b which is in "speed-up mode". The transmission of the supporting signal 13 not only can be done through the data transmission line constructed between operation units, but also can be done using the controlling device 26 as intermediate. In the present embodiment, the supporting signal 13 is transmitted through the controlling device 26, and therefore no additional transmission line is needed. As seen in FIG. 4, when the second AES encryptor 1b receives the supporting signal 13 coming from the working operation unit, the second AES encryptor 1b will start an encryption/decryption operation on the supporting signal 13 in "speed-up mode", and then sends the result of the operation to the integrating device 28, moreover, the integrating device 28 integrates the output of the second AES encryptor 1b which is in "speed-up mode" with the output of the first AES encryptor 1a, and then outputs the result of the foregoing integration. In the present embodiment, the integrating device 28 can connects to the operating device 14 of another operation unit 1 directly for accessing the output thereof without influencing then output of "normal mode".

To sum up, a data block of 128 bits will be divided into four 32 bits inputs, wherein two of the four 32 bits inputs will be processed by the second AES encryptor 1b while the second AES encryptor 1b is idle so that the performance can be enhanced and the process can be accelerated. Since the encryption/decryption operation is heavy and complicated, and the current standard operation requires to operate an input ten times in the AES encryptor before outputting the result, the present invention actually can save a lot of operation time. The present invention not only can use a 32 bits data block as an input unit of idle operation, but also can use a frame or data block of other size as an input unit for increasing operation efficiency.

While the present invention has been shown and described with reference to a preferred embodiment thereof, and in terms of the illustrative drawings, it should be not considered as limited thereby. Various possible modification, omission, and alterations could be conceived of by one skilled in the art to the form and the content of any particular embodiment, without departing from the scope and the sprit of the present invention.

What is claimed is:

1. A speed-up hardware architecture used in wireless encryption/decryption operation, comprising:
    a plurality of advance encryption standard (AES) operation units, each of the plurality of advance encryption standard (AES) operation units is capable of accomplishing a designated advance encryption standard (AES) operation independently, and comprising:
        a data receiving device having two inputs that a first input is used for receiving an external data signal and a second input is used for receiving a supporting signal coming from the other operation unit, wherein, when an operating mode of the data receiving device is "normal", the data receiving device will output the first input, and when an operating mode of the data receiving device is "speed-up", the data receiving device will output the second input; and
        an operating device coupling to the data receiving device for processing data from the data receiving device and outputting the processed data thereafter; and
    a control unit coupling to every operation unit in the architecture for enabling operation units which are idle to assist working operation units for data processing, further comprising:
        a controlling device coupling to the data receiving device of every operation unit in the architecture for issuing a control signal and changing the operating mode; and
        an integrating device coupling to the operating device of every operation unit in the architecture for integrating outputs coming from the operating devices of the operation units which are in "speed-up mode".

2. The speed-up hardware architecture of claim 1, wherein the data receiving device is a multiplexer.

3. The speed-up hardware architecture of claim 1, wherein the data receiving device is a double word selection logic.

4. The speed-up hardware architecture of claim 1, wherein the architecture comprises two AES operation units.

5. The speed-up hardware architecture of claim 1, wherein the controlling device is further connected to the operating device of every operation unit in the architecture for detecting if the operating device is idle.

6. The speed-up hardware architecture of claim 1, wherein the controlling device is able to transmit data.

7. The speed-up hardware architecture of claim 1, wherein the integrating device can be connected directly to the operating device of another operation unit for accessing the output thereof directly.

* * * * *